United States Patent [19]

Hobson et al.

[11] Patent Number: 4,877,286
[45] Date of Patent: Oct. 31, 1989

[54] ADJUSTABLE WIDTH BICYCLE SEAT

[75] Inventors: Richard S. Hobson, Van Nuys; David Potter, Los Angeles, both of Calif.

[73] Assignee: J. B. Two Corporation, Minn.

[21] Appl. No.: 217,054

[22] Filed: Jul. 8, 1988

Related U.S. Application Data

[63] Continuation of Ser. No. 054,613, May 27, 1987.

[51] Int. Cl.⁴ .................................................. B62J 1/00
[52] U.S. Cl. ..................................... 297/195; 297/201; 297/459
[58] Field of Search .......................... 297/195, 201, 459

[56]  References Cited

U.S. PATENT DOCUMENTS

| | | |
|---|---|---|
| 537,376 | 4/1895 | Wright et al. . |
| 557,132 | 3/1896 | Prease .................................. 297/195 |
| 563,063 | 6/1896 | Pullman ............................... 297/201 |
| 564,588 | 7/1896 | Burgess . |
| 576,192 | 2/1897 | Hoyt . |
| 591,330 | 10/1897 | Downes . |
| 604,347 | 5/1898 | Bray . |
| 606,818 | 7/1898 | Best . |
| 608,089 | 7/1898 | Wellmann . |
| 608,682 | 8/1898 | Jamieson ............................... 297/201 |
| 619,204 | 2/1899 | Moore . |
| 620,620 | 3/1899 | Upson . |
| 621,140 | 3/1899 | Reuter . |
| 642,191 | 1/1900 | Wright . |
| 655,598 | 10/1899 | Rowe ..................................... 297/201 |
| 2,200,541 | 5/1940 | Chick .................................. 297/459 X |
| 4,387,925 | 6/1983 | Barker et al. ......................... 297/201 |

FOREIGN PATENT DOCUMENTS

| | | |
|---|---|---|
| 358585 | 12/1905 | France . |
| 360232 | 2/1906 | France . |
| 403707 | 10/1909 | France . |
| 20112 | 8/1895 | United Kingdom . |
| 23321 | 2/1896 | United Kingdom . |
| 6424 | 6/1898 | United Kingdom ................ 297/201 |

Primary Examiner—Francis K. Zugel
Attorney, Agent, or Firm—Merchant, Gould, Smith, Edell, Welter & Schmidt

[57]  ABSTRACT

The present invention provides a bicycle seat with interchangeable horns and one in which the support platforms may be adjusted to a broader base or to a narrower base.

3 Claims, 4 Drawing Sheets

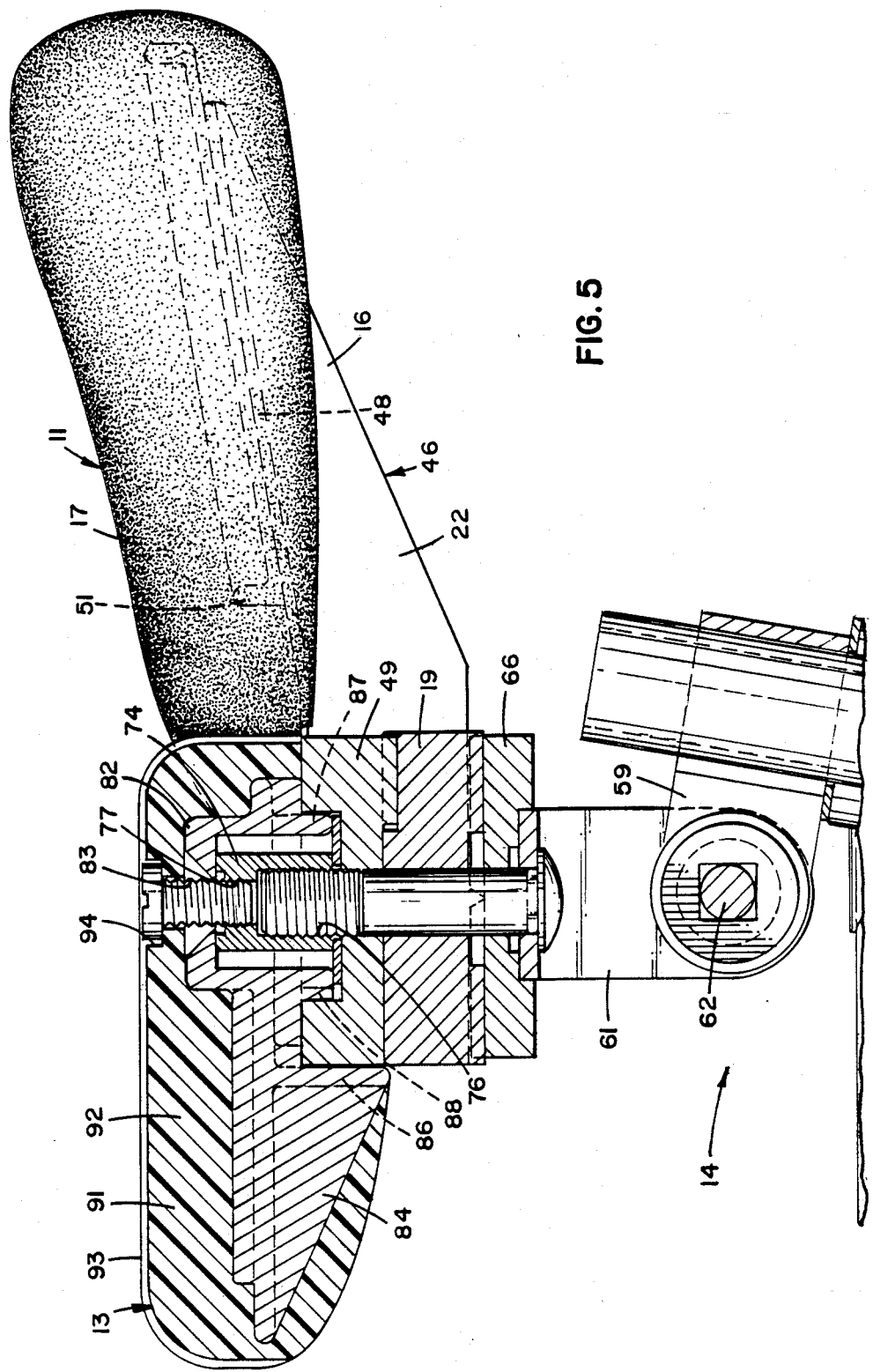

4,877,286

ADJUSTABLE WIDTH BICYCLE SEAT

This is a continuation of application Ser. No. 054,613, filed May 27, 1987.

FIELD OF THE INVENTION

The present invention relates to bicycles, and more particularly, to adjustable bicycle seats.

BACKGROUND OF THE INVENTION

Bicycles have a long history filled with inventions of various sorts. Early bicycles found the rider perched high in the air balancing on a very small seat. Early bicycles had large front wheels and a very small rear wheel. As the bicycle evolved, its overall shape and confirmation changed. Eventually, both the front wheel and the rear wheel were of the same size. In like manner, the bicycle seat itself has evolved. While the very early bicycle seat was small and uncomfortable, later bicycle seats provided a broad base; however, one that was clumsy in use. Such seats often included a pair of spiral springs that would absorb the shock. These seats were not entirely safe due to the fact that the rider would tend to bounce when going over a bump on the riding surface.

A number of years ago, bicycle racing came into vogue, demanding a change in the bicycle seat for competitive purposes. The bicycle seat became streamlined in contrast to the broad, clumsy earlier structure. The streamlined seat, however, was again uncomfortable and the bicycle rider had to be persistent in acclimating to the feel of the seat. Thus, the rider had a choice of the broad, clumsy seat which was comfortable, or the narrow, streamlined seat which had little comfort. In the present invention it was discovered that there is an ideal combination between breadth of support and streamlined character for each individual rider. The present invention provides such an ideal combination.

General Description of the Invention

The bicycle seat of the present invention has a pair of platforms one being provided for each of the buttocks of the rider. The two platforms are adjustable to provide a desired breadth of base. The two platforms are mounted with respect to each other at a pivotal forward point. The two platforms are supported on an attachment mechanism which provides for ready adjustment as desired. The present bicycle seat has an interchangeable horn thus enabling the rider to select between a very short horn or an elongated streamlined horn. The platforms and the horn may be suitably padded for purposes of comfort.

IN THE DRAWINGS:

FIG. 1 is a perspective view of the present invention;
FIG. 2 is an exploded view of the present invention;
FIG. 3 is a top plan view of the present invention;
FIG. 4 is a view taken along the lines 4—4 in FIG. 3 showing the short horn in place;
FIG. 5 is a view of the present invention partically in cross-section showing the elongated horn in place.

DETAILED DESCRIPTION OF THE PRESENT INVENTION

Figure 1:
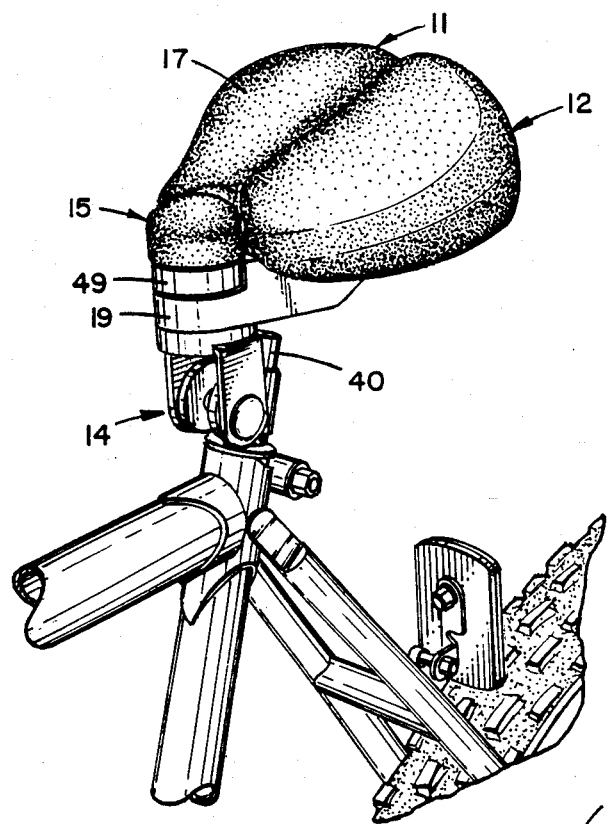

The bicycle seat 10 of the present invention, one embodiment of which is illustrated in FIGS. 1 through 5, has a right platform 11, a left platform 12, and bicycle attachment mechanism 14. The seat 10 may selectively include either the elongated horn 13 or the short horn 15. The left support platform 12 (FIG. 4) includes an underlying frame 16 and a cushion portion 17. The frame 16 includes a blade 18 and an integral attachment ring 19. The blade may include a strengthening upwardly extending rib 21 and a downwardly extending strengthening rib 22. The blade 18 may include a plurality of open areas such as 26 and 27 for molding purposes.

The attachment ring 19 is integral with blade 18. The attachment ring 19 has defined in the center thereof an opening 28 for purposes hereinafter described. The ring 19 (FIG. 2) also includes a plurality of upwardly and radially extending ridges 31, 32 and 33 for purposes hereinafter described. It is to be noted that the attachment ring 19 is positioned offset downwardly from the blade 18 for purposes hereinafter described.

The cushion 17 serves to enclose the upper surface of the underlying frame 16 and may be constructed of a stiff molded foam material such as polystyrene with a smooth outer skin of such polymeric material. The cushion 17 is molded over the blade 18. The cushion 17 is secured in place by the foam flowing around the frame 16 and through the openings such as 26 and 27. The overall shape of the cushion 17 and the blade 18 may be generally semicircular.

The right platform 11 may be constructed substantially identical to the left platform 12 except that right platform 11 is a mirror image of left platform 12. The right platform 11 however has the attachment ring 49 located upwardly with respect to blade 48 as compared to the attachment ring 19 and blade 18. This provides the upper surface of right platform 11 on the same horizontal plane as left platform 12. In other words, right platform 11 has a blade 48 (FIGS. 2 and 3) for example with an upwardly extending strengthening rib 51 and may have a plurality of openings 56 and 57. The cover 47 may likewise be constructed very similar to cover 17 except being in a mirror image.

The bicycle attachment mechanism 14 includes a stem attachment clamp 59 and a U-shaped bracket 61 which may be secured together by a screw 62, washer 63 and burr 64. The screw 62 and burr 64 are used to secure stem attachment clamp 59 to the bicycle stem 40. The attachment mechanism 14 further includes a radial positioning table 66. The table 66 may be cast to include a channel 67 which fits snugly over the bracket 61. The upper surface of table 66 has a plurality of radially extending ridges 68, which are adapted to engage and mate with similar downwardly extending radial ridges of ring 19. A screw 69 FIGS. 2 and 4) extends upwardly through an opening 71 in bracket 61, opening 72 in table 66, opening 28 in ring 19, and opening 58 in ring 49. A washer 73 may be placed on screw 69 and burr 74 may be engaged with screw 69 to secure the various parts together. The burr 74 has a first opening 76 which is threaded for reception of screw 69. The burr 74 has a second smaller threaded opening 77 for reception of screw 78 for purposes hereinafter described.

The horn 13 of the present invention may include a frame 79 including a plate 81 with an integral ring 82. The ring 82 may have an opening 83 defined in the center thereof. The plate 81 may include suitable strengthening ribs such as 84 and 86. The ring 82 has a downwardly extending portion 87 which is snugly received within the enlarged opening 58a. The downwardly extending portion 87 has a projection 88 which may be snugly engaged within one of the slots 58b. The slots 58b provide for proper orientation of the horn 13 when the platforms 11 and 12 are in various positions.

The horn 13 may include a cushion 91 which snugly engages the frame 79. The cushion 91 may include a foamed polymeric material forming a cushion portion 92 and a smooth outer skin of polymeric material 93 being a composition similar to that of the cushion on the support platforms 11 and 12. The cushion 91 has an opening 94 through which screw 50 extends to secure the horn 13 in place.

The button horn 15 (FIG. 4) is interchangeable with the elongated horn 13. The button horn 15 includes a screw 97 which is disposed within a cushion 98. The cushion 98 may be a relatively stiff polymeric material. The screw 97 may be secured in cushion 98 such as by an adhesive or it may be held in place by friction. The screw 97 suitably mates with the upper threaded portion 77 of the burr 74.

Assembly and Operation of the Invention

Figure 2:
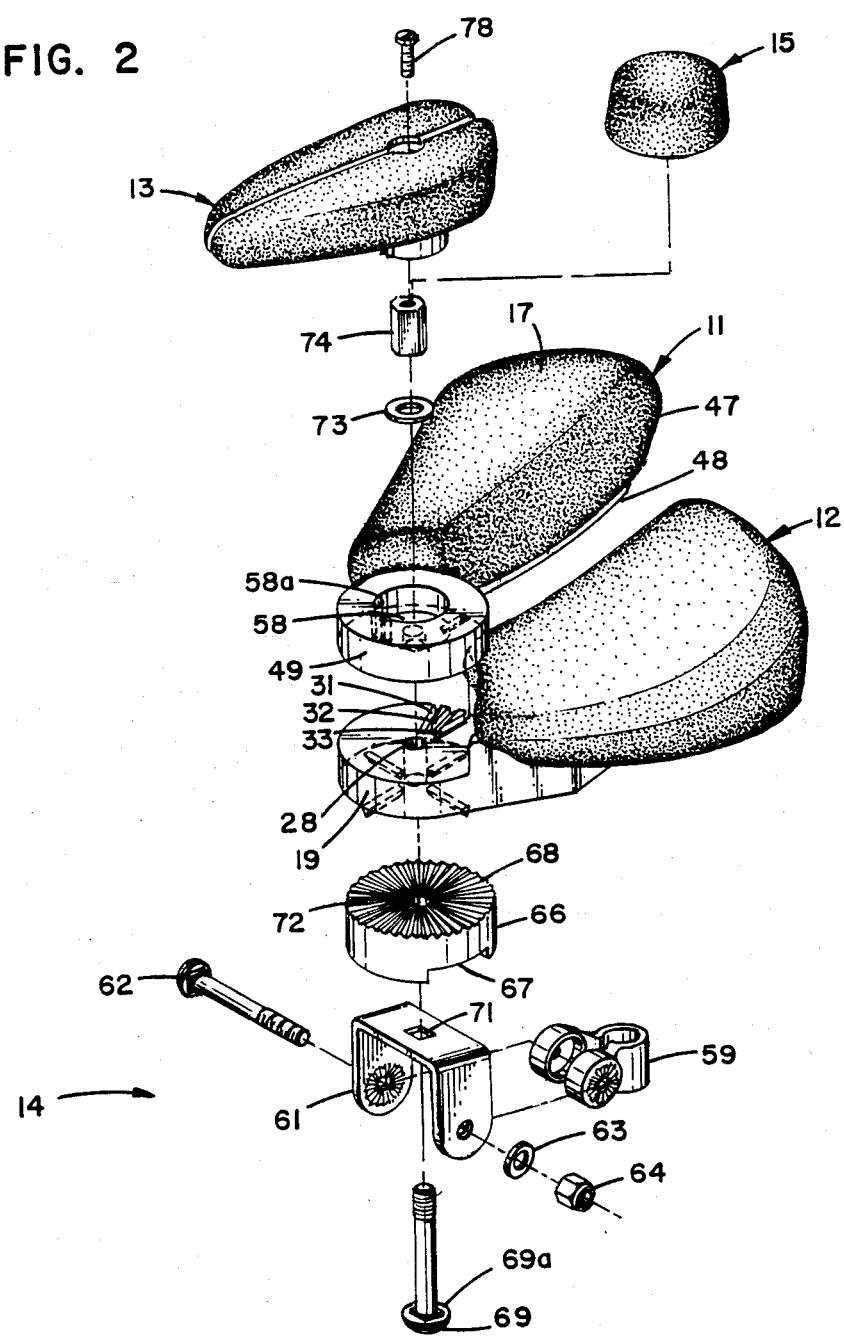
Figure 3:
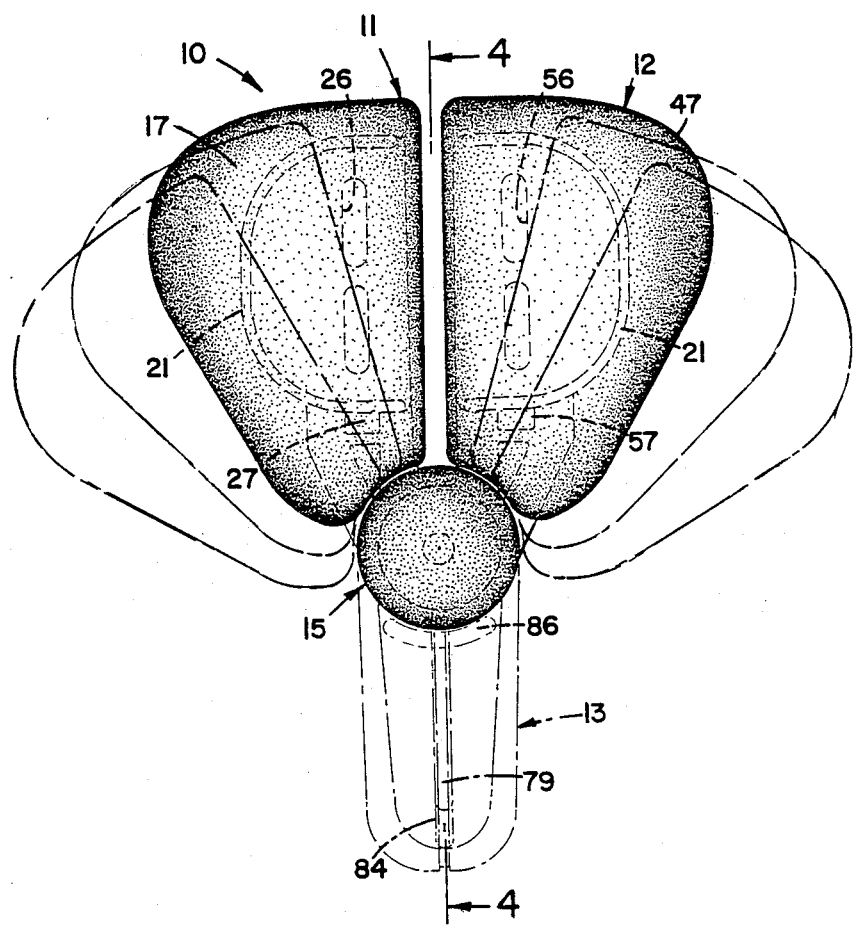

Although the assembly and operation of the operation of the invention would be apparent from the aforedescription, it will be further set forth in detail hereinafter in order to provide a more complete understanding of the invention. Referring to FIG. 2, screw 69 is first extended through the opening 71 in bracket 61 with the square head portion 69a being disposed in the opening 71. The square portion 69a snugly fits within the opening 71 and serves to lock the screw 69 from rotational movement with respect to bracket 69. The table 66 is then mounted on screw 69 with such screw extending through the opening 72 and the channel 67 snugly receiving the upper portion of bracket 61. The screw 69 next extends through the opening 28 in support platform 12 and opening 58 in support platform 11.

Figure 4:
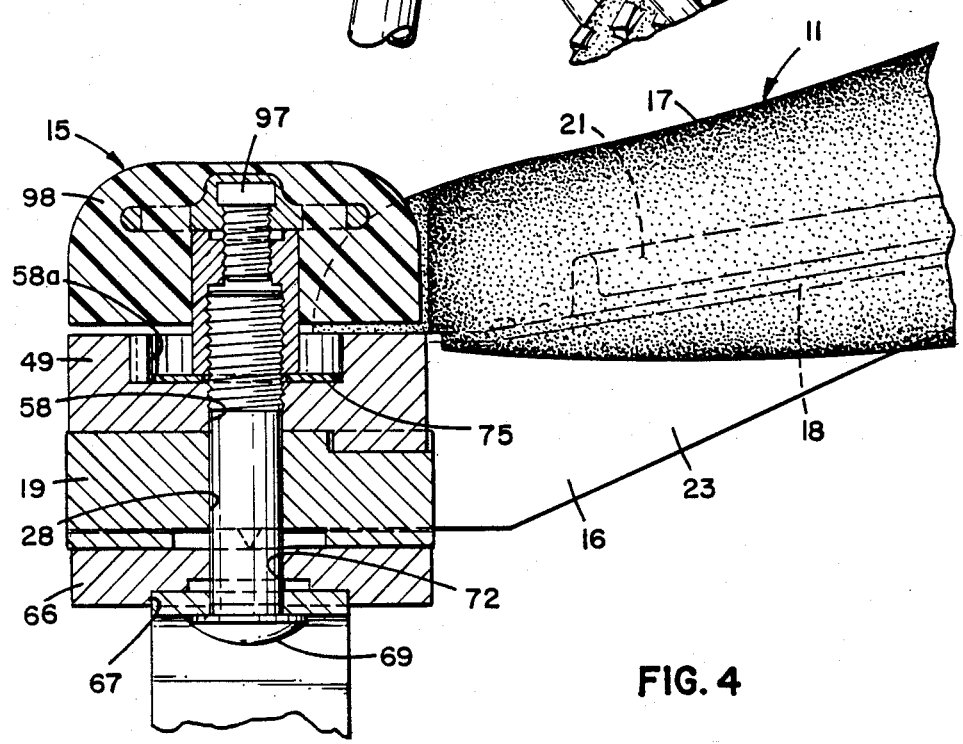

The washer 73 is slipped over screw 69 and burr 74 is threadedly engaged with screw 69 securing the various parts therebetween. The platforms 11 and 12 are adjusted with respect to each other by loosening the burr 74 permitting the ridges or projections in ring 19 to slip along the upper surface 68 of table 66. Also, the ridges extending downwardly from platform 11 slip with respect to the slots 31-33. Once the platforms 11 and 12 are properly adjusted to the desired width, the burr 74 is again tightened down. One then selects between the elongated horn 13 and the button horn 15. Assuming that the user desires the elongated horn 13, screw 78 is engaged with the upper portion of burr 74. The ridges 88 in the frame 84 are engaged in the selected slot, 58b in ring 49 such that the horn 13 is properly aligned with the platforms 11 and 12. Once properly aligned, the screw 78 is tightened down into the upper portion of burr 74. Alternatively, if the user desires to change from the elongated horn 13, the screw 78 is removed and the button horn 15 is engaged as illustrated in FIG. 4. The horn 15 may be integral with the screw 97 or alternatively the cushion portion 98 may merely snap over and frictionally engage the head of the screw 97.

The bicycle seat can, of course, be adjusted for front to back tilt by loosening screw 62 and tilting the seat, thereafter tightening the burr 64 to hold the seat in the desired position. While a particular embodiment of the present invention is illustrated in FIGS. 1 through 5, various modifications may be made without departing from the broader scope of the present invention. For example, any of a variety of horns may be provided.

What is claimed is:

1. A convertible bicycle seat comprising a support shaft, a first rider support platform, a second rider support platform, and means to adjustably secure the support platforms to said support shaft, said securement means being for secure positioning of said rider support platforms at any of selected angles with respect to each other, each of said rider support platforms including a forward ring portion that defines an opening through which said support shaft extends, said second platform support forward ring portion being superimposed over said first platform support forward portion, said support shaft having a threaded upper portion, said securement means comprising a threaded nut which is engaged with said threaded upper shaft portion to secure said first and said second rider support platforms in the selected of said angular positions, said set further including a horn portion and a button portion, one of said horn portion and said button portion being selectively secured over said threaded nut, one of said forward portions including at least one projection and the other of said forward portions including a recess for reception of said at least one projection thereby releasably locking said forward portions from rotational movement with respect to each other, one of said support shaft and said first platform portion including at least one projection and the other of said shaft and platform portion including recess means thereby locking said support platforms from rotational movement with respect to said shaft.

2. The bicycle seat of claim 1 wherein said seat further includes a horn portion that is secured over said threaded nut, said threaded nut having a threaded opening defined therein, said opening having a lower portion of englarged diameter and an upper portion of smaller diameter, and a screw for securing said horn to said support shaft, said screw being threadedly engaged in the small diameter portion of said nut, whereby said opening of enlarged diamter is adapted to receive said threaded support shaft and the upper threaded portion of said nut is adapted to receive said screw for retention of said horn portion.

3. The bicycle seat of claim 1 wherein said seat further includes a button, said button having an integral screw mounted therein and said nut having a threaded opening defined therein, said opening having a lower portion of enlarged diameter and an upper portion of smaller diamter, said screw being adapted for securing said button to said support shaft, said screw being threadedly engaged in the small diamter portion of said nut, whereby said opening of enlarged diameter is adapted to receive said threaded support shaft and the upper threaded portion of said nut is adapted to receive said screw for retention of said button.

* * * * *